(12) United States Patent
Esposito

(10) Patent No.: US 10,125,713 B2
(45) Date of Patent: Nov. 13, 2018

(54) METHOD OF DETECTING A CLOGGING OF A FUEL INJECTOR IN AN INTERNAL COMBUSTION ENGINE

(71) Applicant: GM GLOBAL TECHNOLOGY OPERATIONS LLC, Detroit, MI (US)

(72) Inventor: Raffaele Esposito, Siano (IT)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 15/370,286

(22) Filed: Dec. 6, 2016

(65) Prior Publication Data

US 2018/0156151 A1    Jun. 7, 2018

(51) Int. Cl.
*G01M 15/04* (2006.01)
*F02D 41/22* (2006.01)

(52) U.S. Cl.
CPC .................................. *F02D 41/221* (2013.01)

(58) Field of Classification Search
USPC ........................................ 73/114.45, 114.48
See application file for complete search history.

(56) References Cited

U.S. PATENT DOCUMENTS

| | | | | |
|---|---|---|---|---|
| 5,022,364 A | * | 6/1991 | Phillips | F02M 65/008 123/198 A |
| 5,535,621 A | * | 7/1996 | Glidewell | F02D 41/221 123/478 |
| 6,234,002 B1 | * | 5/2001 | Sisney | F02M 65/001 134/166 R |
| 2002/0112528 A1 | * | 8/2002 | Antonioli | F02D 41/0085 73/49.7 |
| 2009/0019935 A1 | * | 1/2009 | Horak | F02M 65/00 73/593 |
| 2009/0158833 A1 | * | 6/2009 | Kusatsugu | F02D 41/0087 73/114.45 |
| 2012/0150417 A1 | * | 6/2012 | Massaro | F02D 41/222 701/104 |
| 2013/0185908 A1 | * | 7/2013 | Bernhaupt | F02M 61/168 29/402.01 |
| 2017/0152826 A1 | * | 6/2017 | Claude | F02M 65/001 |

* cited by examiner

*Primary Examiner* — Eric S McCall
(74) *Attorney, Agent, or Firm* — Lorenz & Kopf, LLP

(57) ABSTRACT

A method and apparatus are disclosed for detecting a clogging of a fuel injector of an internal combustion engine. Each fuel injector of the plurality of fuel injectors may be tested for a clogging. A test injector is switch off. A requested value of a fuel quantity to be injected by the other fuel injectors of the plurality of fuel injectors is adjusted to operate the internal combustion engine in an idle mode. A difference is calculated between the requested value of the fuel quantity and a reference value of the fuel quantity to be injected by all the fuel injectors of the plurality of fuel injectors to operate the internal combustion engine in idle mode. The calculated difference for each test injector is used to identify if the test injector is clogged.

18 Claims, 2 Drawing Sheets

METHOD OF DETECTING A CLOGGING OF A FUEL INJECTOR IN AN INTERNAL COMBUSTION ENGINE

TECHNICAL FIELD

The present disclosure pertains to a method of detecting a clogging of a fuel injector in an internal combustion engine of a motor vehicle, typically a Diesel engine.

BACKGROUND

It is known that a Diesel engine is generally equipped with an injection system that includes a plurality of electrically controlled fuel injectors for injecting fuel directly into cylinders.

Clogging of one or more fuel injector, for example due to coking presence, may lead to a degradation of engine power, drivability and emission performances. Thus, a need exists for a method that may detect if one or more of the fuel injectors is clogged or partially clogged, thereby preventing the substitution of all the fuel injectors. The method may be performed at a vehicle service center.

SUMMARY

An embodiment of the disclosure provides a method of detecting a clogging of a fuel injector of an internal combustion engine equipped with a plurality of fuel injectors that includes testing each fuel injector of the plurality of fuel injectors. The fuel injector is switched off. A requested value of a fuel quantity to be injected by the other fuel injectors of the plurality of fuel injectors is adjusted to operate the internal combustion engine in idle mode. A difference is calculated between the requested value of the fuel quantity and a reference value of the fuel quantity to be injected by all the fuel injectors of the plurality of fuel injectors to operate the internal combustion engine in idle mode. Each calculated difference is used to identify if the corresponding fuel injector is clogged.

As a result, it is possible to detect if one of the fuel injectors of an internal combustion engine is clogged or partially clogged, identify the clogged fuel injector independently to the condition of the other fuel injectors and substitute only the clogged or partially clogged fuel injector without needing of hydraulic unit fuel injector test benches, reducing therefore the service procedure costs and time. Moreover, this solution makes it possible to detect the clogging of a fuel injector using a procedure that can be implemented using the electronic control unit of the internal combustion engine and the associated sensors and controls without needing of a connection of the fuel injection system to external hydraulic units.

According to an embodiment, the method may further include comparing each calculated difference with a predetermined threshold value; and identifying that a fuel injector is clogged if the corresponding calculated difference is smaller than or equal to the predetermined threshold value. This aspect of the present disclosure provides a reliable solution for detecting the clogged or partially clogged fuel injector even if more than one fuel injector of the plurality of fuel injectors is contemporaneously clogged or partially clogged.

The proposed solution, achieving basically the same effects of the method described above, may be carried out with the help of a computer program including a program-code for carrying out, when run on a computer, the method described above, and in the form of a computer program product including the computer program. The method can be also embodied as an electromagnetic signal, the signal being modulated to carry a sequence of data bits which represent a computer program to carry out all steps of the method.

Another embodiment of the solution, achieving basically the same effects of the method described above, provides an internal combustion engine equipped with a plurality of fuel injectors and an electronic control unit configured to carrying out the method as above disclosed. Again, an embodiment of the solution may provide an automotive system, such as for example a passenger car, equipped with an internal combustion engine as disclosed above.

Another embodiment of the solution, achieving basically the same effects of the method described above, provides an apparatus for detecting a clogging of a fuel injector of an internal combustion engine equipped with a plurality of fuel injectors. The apparatus includes an electronic device, usually referred as scan tool, which is not part of an automotive system and which may be provided to authorized repair technicians for performing diagnostics of the automotive system, configured to carry out the method as disclosed above.

Another embodiment of the solution provides an apparatus for detecting a clogging of a fuel injector of an internal combustion engine equipped with a plurality of fuel injectors. The apparatus is configured to test each fuel injector of the plurality of fuel injectors, and includes means for switching off the fuel injector, means for adjusting a requested value of a fuel quantity to be injected by the other fuel injectors of the plurality of fuel injectors to operate the internal combustion engine in idle mode, and means for calculating a difference between the requested value of the fuel quantity and a reference value of the fuel quantity to be injected by all the fuel injectors of the plurality of fuel injectors to operate the internal combustion engine in idle mode. The apparatus further includes means for using each calculated difference to identify if the corresponding fuel injector is clogged.

This embodiment achieves basically the same effects of the method described above, particularly that of detecting if one of the fuel injectors of an internal combustion engine is clogged or partially clogged, identify the clogged fuel injector independently to the condition of the other fuel injectors and substitute only the clogged or partially clogged fuel injector without needing of hydraulic unit fuel injector test benches, reducing therefore the service procedure costs and time.

As a result, it is possible to detect the clogging of a fuel injector using a procedure that can be implemented using the electronic control unit of the internal combustion engine and the associated sensors and controls without needing of a connection of the fuel injection system to external hydraulic units.

According to an embodiment, the apparatus may include means for comparing each calculated difference with a predetermined threshold value; and means for identifying that a fuel injector is clogged if the corresponding calculated difference is smaller than or equal to the predetermined threshold value. This aspect of the present disclosure provides a reliable solution for detecting the clogged or partially clogged fuel injector even if more than one fuel injector of the plurality of fuel injectors is contemporaneously clogged or partially clogged.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
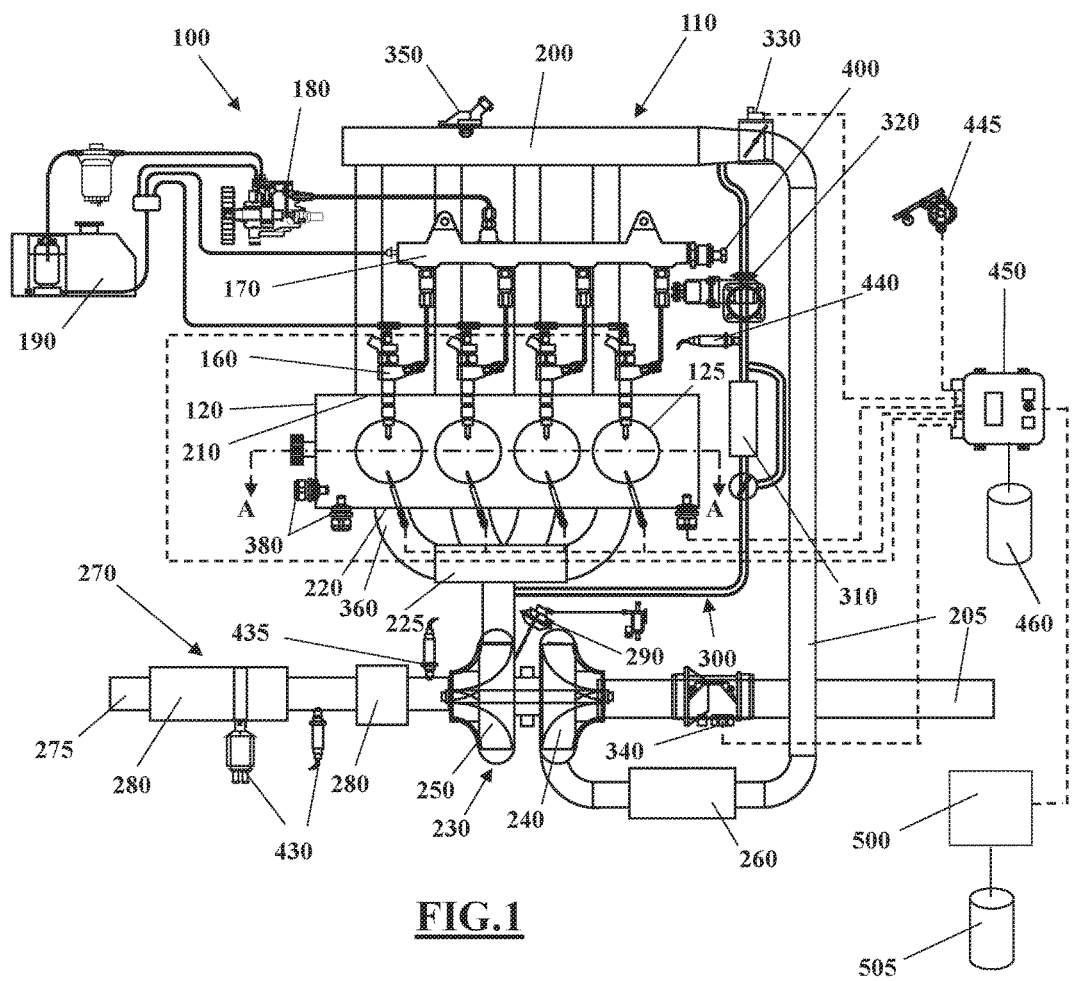
FIG. 1 shows a schematic representation of automotive engine system.
Figure 2:
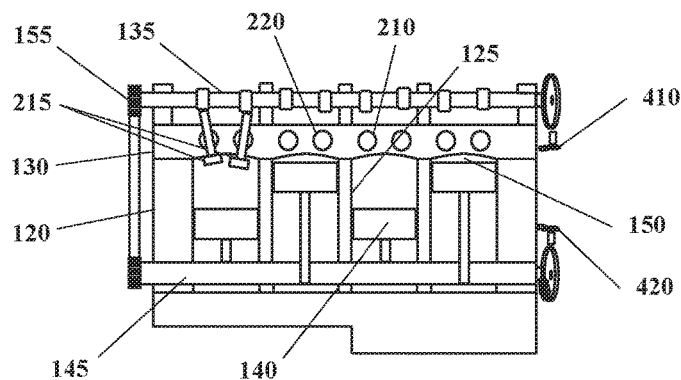
FIG. 2 is a cross-section of an internal combustion engine belonging to the automotive engine system of FIG. 1.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. The fuel injection system with the above disclosed components is known as common rail Diesel injection system (CR System). It is a relative new injection system for passenger cars. The main advantage of this injection system, compared to others, is that due to the high pressure in the system and the electromagnetically controlled injectors it is possible to inject the correct amounts of fuel at exactly the right moment. This implies lower fuel consumption and fewer emissions.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas system 270. This example shows a variable geometry turbine (VGT) 250 with a VGT actuator 255 arranged to move the vanes to alter the flow of the exhaust gases through the turbine 250.

The exhaust gas system 270 may include an exhaust gas line 275 having one or more exhaust after-treatment devices 280. The after-treatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC), a lean NOx trap (LNT), hydrocarbon adsorbers, a reductant storage device, such as a selective catalytic reduction (SCR) systems or a Selective Catalytic Reduction washcoated particulate filter (SDPF or SCR on DPF) located in the exhaust line 275 downstream of the LNT, and particulate filters, in particular a Diesel Particulate Filter (DPF).

Other embodiments may include an exhaust gas recirculation (EGR) duct 300 coupled between the exhaust manifold 225 and the intake manifold 200. The EGR duct 300 may include an EGR cooler 310 to reduce the temperature of the exhaust gases in the EGR duct 300. An EGR valve 320 regulates a flow of exhaust gases in the EGR duct 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an oxygen sensor 435, for example an Universal Exhaust Gas Oxygen (UEGO) sensor or a lambda sensor or a nitrogen oxides sensor, for measuring an oxygen concentration in the exhaust gas present in the exhaust gas line 275 preferably upstream of the aftertreatment devices 280, an EGR temperature sensor 440, and an accelerator pedal position sensor 445.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, and the cam phaser 155. Note, dashed lines are used to indicate communication between the ECU 450 and the various sensors and devices, but some are omitted for clarity.

Turning now to the ECU 450, this apparatus may include a digital central processing unit (CPU 460) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing the computer program code is impressed on the transitory electromagnetic signal. Such signals are e.g. made use of when transmitting computer program code in a wireless fashion via a wireless connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in a motor vehicle.

The ECU 450, or any other substitutive type of processor deployed in the motor vehicle, may be set in communication, via cable or in wireless fashion, with an electronic device 500, usually referred as scan tool, which is not part of the automotive system 100 and which may be provided to authorized repair technicians for performing diagnostics of the automotive system 100. The electronic device 500 may receive input signals from a user interface (e.g. a keyboard), send and receive signals to/from the ECU 450, and display data and/or other information on a visualizer (e.g. a display). To do so, the electronic device 500 may include a digital central processing unit (CPU) in communication with a memory system 505 and an interface bus. The CPU is configured to execute instructions stored as a program in the memory system 505, and send and receive signals to/from the interface bus. The interface bus may be configured to send, receive, and modulate analog and/or digital signals to/from the ECU 450. The memory system 505 may include various storage types including optical storage, magnetic storage, solid state storage, and other non-volatile memory. The program stored in the memory system 505 is transmitted from outside via a cable or in a wireless fashion. Outside the electronic device 500, the program is normally visible as a computer program product, which should be understood to be a computer program code residing on a carrier, the carrier being transitory or non-transitory in nature with the consequence that the computer program product can be regarded to be transitory or non-transitory in nature, as explained above.

The program stored in the memory system 505 of the electronic device 500 may cooperate with the program stored in the memory system of the ECU 450 to embody the methods that will be disclosed hereafter, allowing the respective CPUs to carryout out the steps of such methods. In other words, some of the steps may be performed by the CPU of the electronic device 500, some other steps may be performed by the CPU of the ECU 450, and some other steps may be performed by the CPU of the ECU 450 under instruction of the CPU of the electronic device 500.

Figure 3:
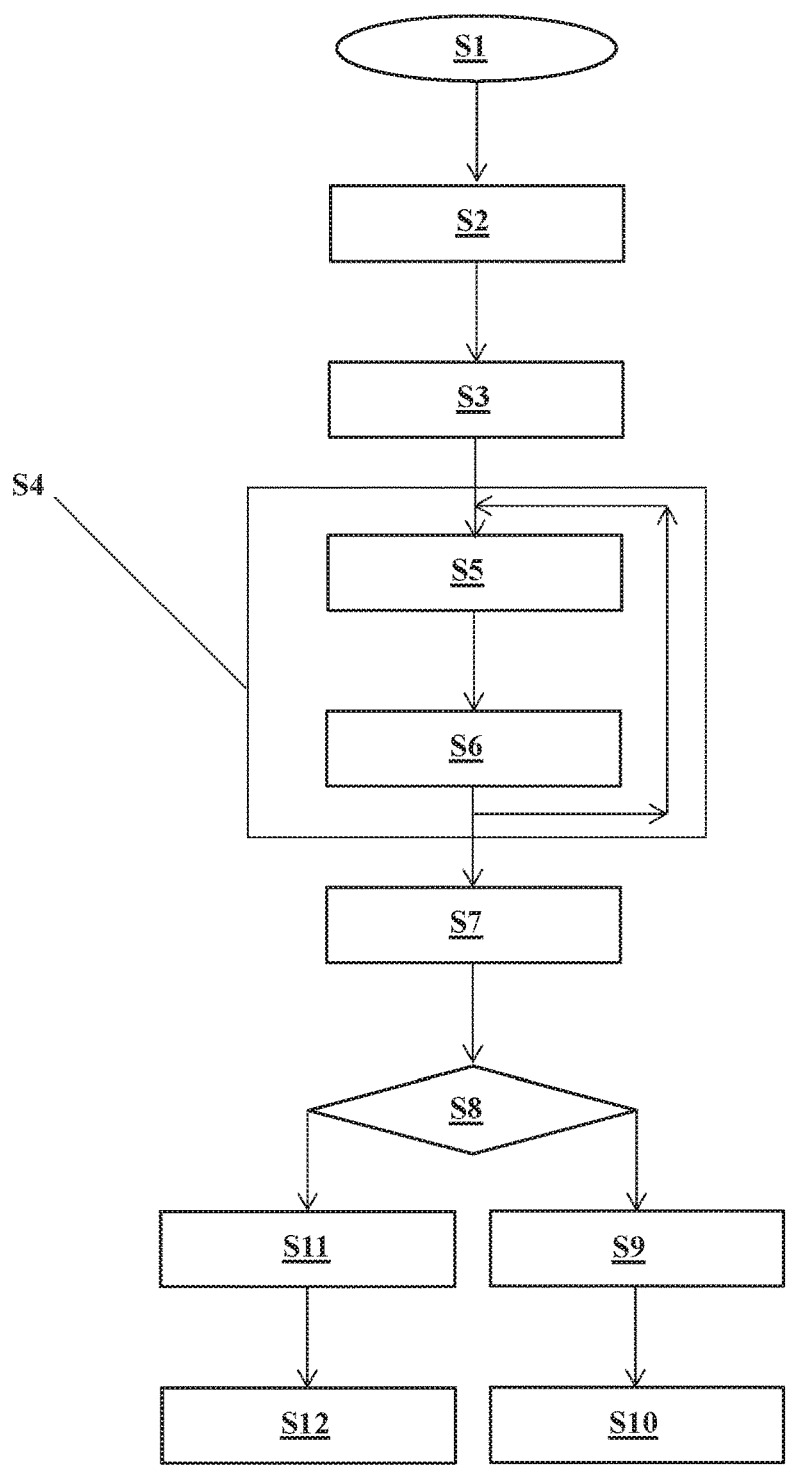
FIG. 3 is a schematic representation of a flowchart of a method of detecting a clogging of a fuel injector.

The method here concerned, shown in the diagram of FIG. 3, is a method of detecting a clogging of at least one fuel injector 160 of a plurality of fuel injectors 160 of the ICE 110, which is intended to be executed in the context of a maintenance service of the motor vehicle, for example a maintenance service caused by the activation of a warning procedure related to a fuel injection system i.e. a common rail Diesel injection system (CR System). While the motor vehicle is standing in parking mode in a predetermined place, for example in a garage, a repair technician may connect the external electronic device 500 to the ECU 450 and start the testing method. The electronic device 500 may be configured to start (block 51) the method upon the reception of a single command that the technician may deliver through the user interface.

Referring to the flowchart of FIG. 3, once the starting command has been received, the electronic device 500 may command the ECU 450 to operate the ICE 110 at idle speed. Idle speed is the rotational speed of the crankshaft 145 (generally measured in revolutions per minute or rpm) that the ICE 110 generates when the ICE 110 is uncoupled to the drivetrain and the accelerator pedal is not depressed. At idle speed, the ICE 110 generates enough power to run reasonably smoothly and to operate its ancillaries (water pump, alternator and other accessories), but usually not enough to move the motor vehicle. For a passenger-car, idle speed is customarily between 600 rpm and 1100 rpm. The electronic device 500 may command the ECU 450 to operate the ICE 110 at a pre-calibrated value of idle speed, preferably greater than the above the standard values, for example of about 2000 rpm.

In order to operate the ICE 110 at idle speed, the ECU 450 may be configured to carry out a closed-loop control of the engine speed, which includes the steps of measuring the rotational speed of the crankshaft 145, for example by the crank position sensor 420, and then of adjusting a requested value of the quantity of fuel that has to be injected into the combustion chambers 150 to minimize a difference between the measured speed and the idle speed.

While the motor vehicle is standing still and the ICE 110 is operating at idle speed, the electronic device 500 may command the ECU 450 to start the intrusive method of detecting the clogging of the fuel injectors 160.

As a first step of the method, the electronic device 500 may command the ECU 450 to operate (block S2) all the fuel injectors 160 to inject, according to a predetermined fuel injection pattern, a requested fuel quantity that guaranties the ICE 110 to run at idle speed (namely at the pre-calibrated value thereof). For example, the predetermined fuel injection pattern may be set in order to have a number of injection pulses for each fuel injector 160 predetermined during experimental activities and stored in the memory system 505.

The electronic device 500 may command the ECU 450 to determine (block S3) a reference value $Q_{ref}$ of the requested fuel quantity to be injected by all the fuel injectors 160 which guarantees the ICE 110 to run at idle speed. To do so, the electronic device 500 may command the ECU 450 to check when the ICE 110 reaches a steady state condition. A steady state condition is reached when a variation of the engine speed gets smaller than a predetermined threshold value thereof and a variation of the requested value of the quantity of fuel gets smaller than a predetermined threshold value thereof. Moreover, the predetermined threshold value of the engine speed and the predetermined threshold value of the requested value are values pre-calibrated on dedicated tests performed on a test bench and stored in the memory system 505.

When the ICE 110 reaches the steady state condition, the electronic device 500 may command the ECU 450 to verify that the requested fuel quantity, that guaranties the ICE 110 to run at idle speed, is stable. To do so, by way of an example, the ECU 450 may determine a plurality of values of the requested fuel quantity in a predetermined period of time and, when the difference between a plurality of consecutive pair of determined values (or the gradient) gets lower than a predetermined threshold value thereof, the ECU 450 may identify that the requested fuel quantity is stable. The predetermined period of time may be predetermined during experiment activities and stored in the memory system 505.

When the requested fuel quantity is identified as stable, the electronic device 500 may command the ECU 450 to calculate the reference value $Q_{ref}$ of the requested fuel quantity calculated as the average of a plurality of determined values of the requested fuel quantity in a predetermined period of time, predetermined during experiment activities and stored in the memory system 505, and to store the reference value $Q_{ref}$ in the memory system 505. In particular, the reference value $Q_{ref}$ is representative of the requested fuel quantity that guaranties the ICE 110 to run at idle speed (in parking mode) when all the fuel injectors 160 of the plurality of fuel injectors 160 are operated.

Once the ECU 450 has operated all the fuel injectors 160 using the reference value $Q_{ref}$ to inject the requested fuel quantity, the electronic device 500 may command the ECU 450 to test (block S4) each fuel injector 160 of the plurality of fuel injectors 160 as disclosed hereinafter. For each fuel injector 160, the test provide for the ECU 450 to switch off (block S5) the tested fuel injector 160 while the other fuel injectors 160 of the plurality of fuel injectors continue to inject the requested fuel quantity into the respective combustion chambers 150.

Once the fuel injector 160 is switched off, the test may provide for the ECU 450 to adjust (block S6), carrying out the closed-loop control of the engine speed as disclosed above, a requested value $Q_{req\_n}$ of the requested fuel quantity to be injected, according to the predetermined fuel injection pattern, by the operated fuel injectors 160, in order to maintain the engine speed equal to the same idle speed, namely the same idle speed value used in blocks 2 and 3 for determining the reference value $Q_{ref}$.

The test may, therefore, provide for the ECU 450 to check when the ICE 110 reaches a (new) steady state condition (with one of the fuel injectors 160 switched off), in which a variation of the engine speed gets smaller than the predetermined threshold value thereof and a variation of the requested value of the quantity of fuel gets smaller than the predetermined threshold value thereof.

When the ICE 110 reaches the (new) steady state condition, the test may provide for the ECU 450 to verify that the requested fuel quantity, that guaranties the ICE 110 to run at idle speed with a one of the fuel injectors 160 switched off, is stable. To do so, by way of example, the ECU 450 may determine a plurality of values of the requested fuel quantity in a predetermined period of time and, when the difference between a plurality of consecutive pair of determined values (or the gradient) gets lower than a predetermined threshold value thereof, the ECU 450 may identify that the requested fuel quantity is stable. This predetermined period of time may be predetermined during experimental activities and stored in the memory system 505.

When the requested fuel quantity is identified as stable, the test may provide for the ECU 450 to determine the requested value $Q_{req\_n}$ of the requested fuel quantity calculated as the average of a plurality of determined values of the requested fuel quantity in a predetermined period of time and to store the requested value $Q_{req\_n}$ in the memory system 505. Also this predetermined period of time may be predetermined during experiment activities and stored in the memory system 505. In particular, the requested value $Q_{req\_n}$ of each test is representative of the requested fuel quantity that guaranties the ICE 110 to run at idle speed (in parking mode) when the (one) tested fuel injector 160 is switched off and the other fuel injectors 160 are operated.

Once all the tests (in number equal to the number of the fuel injectors 160) are performed and each requested value $Q_{req\_n}$ is stored in the memory system 505, the electronic device 500 may command the ECU 450 to calculate (block S7) a difference $\Delta_{tot\_n}$ between the requested value $Q_{req\_n}$ of each test and the reference value $Q_{ref}$. The difference $\Delta_{tot\_n}$ of each test, therefore, may be calculated with the following formula:

$$\Delta tot\_n = Qreq\_n - Qref$$

Once each difference $\Delta_{tot\_n}$ is calculated the electronic device 500 may command the ECU 450 to store each of them in the memory system 505.

The electronic device 500 may command the ECU 450 to use each calculated difference $\Delta_{tot\_n}$ to identify if the corresponding fuel injector 160 is clogged, namely to use the i-th calculated difference $\Delta_{tot\_n\_i}$, calculated between the i-th requested value $Q_{req\_n\_i}$ (determined during the i-th fuel injector $160_i$ is switched off) and the reference value $Q_{ref}$, to identify whether the i-th fuel injector $160_i$ is clogged. In detail, the electronic device 500 may command the ECU 450 to compare (block S8) each calculated difference $\Delta_{tot\_n}$ with a predetermined threshold value, pre-calibrated during experimental activities and stored in the memory system 505. In particular, the predetermined threshold value may depend on the target of clogging degree that is programmed to detect. More in detail, the lower value may be the target of clogging degree to detect, and the higher is the predetermined threshold value.

The electronic device 500 may then command the ECU 450 to identify (block S9) that one (or more) of the fuel injectors 160 is clogged if the corresponding calculated difference $\Delta_{tot\_n}$ is smaller than or equal to the predetermined threshold value. In practice, the lower is the calculated difference $\Delta_{tot\_n}$ of the i-th fuel injector $160_i$ and the higher is the probability that the (switched-off) i-th fuel injector $160_i$ is clogged, because switching-off this i-th fuel injector $160_i$ its contribution to the idle speed regulation (by the injection of the fuel request) does not change than when it is operative, in other words the i-th fuel injector $160_i$ is working as if it were switched off and therefore is clogged.

Again, the electronic device 500 may be configured to display (block S10) a test status message on the display reporting the identification (position and/or number) of the at least one fuel injector 160 identified as clogged. On the contrary the electronic device 500 may command the ECU 450 to identify (block S11) that one (or more) of the fuel injectors 160 is properly functioning if the corresponding calculated difference $\Delta_{tot\_n}$ is greater than the predetermined threshold value. Again, the electronic device 500 may be configured to display (block S12) a further test status message on the display reporting the identification (position and/or number) of the fuel injectors 160 identified as properly functioning.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of detecting a clogging of a fuel injector of an internal combustion engine having a plurality of fuel injectors comprising:
   switching off a test injector of the plurality of fuel injectors;
   adjusting a requested value of a fuel quantity to be injected by the plurality of fuel injectors except the test injector for operating the internal combustion engine in an idle mode; and
   calculating a difference between the requested value of the fuel quantity and a reference value of the fuel quantity to be injected by all of the plurality of fuel injectors including the test injector to operate the internal combustion engine in the idle mode; and
   identifying if the test injector is clogged based on the calculated difference.

2. The method of claim 1 is repeated such that each of the plurality of fuel injectors comprises a test injector.

3. The method of claim 2, further comprising:
   comparing each calculated difference with a predetermined threshold value; and
   identifying that a given injector is clogged if the corresponding calculated difference is smaller than or equal to the predetermined threshold value.

4. The method of claim 1 further comprising displaying a test status message indicating if the test injector is identified as clogged.

5. The method of claim 1 further comprising identifying if the test injector is not clogged based on the calculated difference.

6. The method of claim 5 further comprising displaying a test status message indicating if the test injector is identified as not clogged.

7. A non-transitory computer readable medium comprising a computer program for detecting a clogging of a fuel injector of an internal combustion engine equipped with a plurality of fuel injectors, the computer program having a program code, which when run on a computer, is configured to:
   switch off a test injector of the plurality of fuel injectors;
   adjust a requested value of a fuel quantity to be injected by the plurality of fuel injectors except the test injector for operating the internal combustion engine in an idle mode;
   calculate a difference between the requested value of the fuel quantity and a reference value of the fuel quantity to be injected by all of the plurality of fuel injectors including the test injector to operate the internal combustion engine in the idle mode; and
   identify if the test injector is clogged based on the calculated difference.

8. The non-transitory computer readable medium according to claim 7, wherein the computer program further comprises a program code, which when run on a computer, such that each of the plurality of fuel injectors comprises a test injector.

9. The non-transitory computer readable medium according to claim 8, wherein the computer program further comprises a program code, which when run on a computer, is configured to:
   compare each calculated difference with a predetermined threshold value; and
   identify that a given injector is clogged if the corresponding calculated difference is smaller than or equal to the predetermined threshold value.

10. The non-transitory computer readable medium according to claim 7, wherein the computer program further comprises a program code, which when run on a computer, is configured to display a test status message indicating if the test injector is identified as clogged.

11. The non-transitory computer readable medium according to claim 7, wherein the computer program further comprises a program code, which when run on a computer, is configured to identify if the test injector is not clogged based on the calculated difference.

12. The non-transitory computer readable medium according to claim 10, wherein the computer program further comprises a program code, which when run on a computer, is configured to display a test status message indicating if the test injector is identified as not clogged.

13. A scan tool comprising a computer program having a program code executed on a computer processor for detecting a clogging of a fuel injector of an internal combustion engine equipped with a plurality of fuel injectors, wherein the scan too is configured to:
   switch off a test injector of the plurality of fuel injectors;
   adjust a requested value of a fuel quantity to be injected by the plurality of fuel injectors except the test injector for operating the internal combustion engine in an idle mode;
   calculate a difference between the requested value of the fuel quantity and a reference value of the fuel quantity to be injected by all of the plurality of fuel injectors including the test injector to operate the internal combustion engine in the idle mode; and
   identify if the test injector is clogged based on the calculated difference.

14. The scan tool according to claim 13, wherein the scan tool is further configured to detect a clogging of each of the plurality of fuel injectors.

15. The scan tool according to claim 13, wherein the scan tool is further configured to:
   compare each calculated difference with a predetermined threshold value; and
   identify that a given injector is clogged if the corresponding calculated difference is smaller than or equal to the predetermined threshold value.

16. The scan tool according to claim 13, wherein the scan tool is further configured to display a test status message indicating if the test injector is identified as clogged.

17. The scan tool according to claim 13, wherein the scan tool is further configured to identify if the test injector is not clogged based on the calculated difference.

18. The scan tool according to claim 17, wherein the scan tool is further configured to display a test status message indicating if the test injector is identified as not clogged.

* * * * *